United States Patent [19]

Heidemann et al.

[11] Patent Number: 5,302,922
[45] Date of Patent: Apr. 12, 1994

[54] EQUALIZER FOR OPTICALLY TRANSMITTED ANALOG INFORMATION SIGNALS

[75] Inventors: Rolf Heidemann, Weinsberger; Heinz Krimmel, Stuttgart; Bernhard Junginger, Herrenberg, all of Fed. Rep. of Germany

[73] Assignee: Alcatel N.V., Amsterdam, Netherlands

[21] Appl. No.: 905,836

[22] Filed: Jun. 29, 1992

[30] Foreign Application Priority Data

Jun. 29, 1991 [DE] Fed. Rep. of Germany ....... 4121569

[51] Int. Cl.⁵ .............................................. H03H 7/03
[52] U.S. Cl. .................................. 333/18; 333/28 R; 333/164; 359/180
[58] Field of Search .................. 333/16, 20, 23, 18, 333/28 R, 164; 359/180, 187, 188

[56] References Cited

U.S. PATENT DOCUMENTS

| 4,855,696 | 8/1989 | Tan et al. ................................ 333/20 |
| 5,014,018 | 5/1991 | Rodwell et al. ....................... 333/20 |
| 5,023,574 | 6/1991 | Anklam et al. ........................ 333/20 |

FOREIGN PATENT DOCUMENTS

| 921101945 | of 0000 | European Pat. Off. |
| 3307309 | 9/1984 | Fed. Rep. of Germany |
| 1-165214 | 6/1989 | Japan |
| 3-094523 | 4/1991 | Japan |
| 9107027 | 5/1991 | PCT Int'l Appl. |

OTHER PUBLICATIONS

"Electrical Predistortion to Compensate for Combined Effect of Laser Chirp and Fibre Dispersion", H. Gysel et al., *Electronics Letters*, Feb. 2, 1991, vol. 27, No. 5, pp. 421-423.

"Equalizer for Step-Index Fiber Transmission System", K. Yamaguchi et al., *Third European Conference on Optical Communication*, Sep. 1977, Munich, pp. 202-204.

"Passive Equalization of Semiconductor Diode Laser Frequency Modulation", S. Alexander et al., *Journal of Lightwave Technology*, vol. 7, No. 1, Jan. 1989, pp. 11-23.

"Electrical Predistortion to Compensate for Combined Effect of Laser Chirp and Fibre Dispersion", H. Gysel et al., *Electronics Letters*, Feb. 28, 1991, vol. 27, No. 5, pp. 421-423.

*Primary Examiner*—Paul Gensler
*Attorney, Agent, or Firm*—Ware, Fressola, Van Der Sluys & Adolphson

[57] ABSTRACT

To compensate for nonlinear distortions in analog optical communication transmission systems, caused by laser chirps and the chromatic dispersion of the optical fiber, an equalizer in the form of an LC component is known, whose capacitance is formed by a variable capacitance diode. If this equalizer is to be adjusted for considerable signal distortions (long transmission path length), it must operate at great capacitance, which reduces its bandwidth. In order to be able to equalize large bandwidth signals (e.g. 600 MHz) containing considerable distortions, the invention indicates an LC chain circuit with LC components of the known type, as the equalizer. Further developments of this solution concern the appropriate polarizing of the variable capacitance diode and maintaining the frequency response constant, when adjusting the equalization.

10 Claims, 4 Drawing Sheets

EQUALIZER FOR OPTICALLY TRANSMITTED ANALOG INFORMATION SIGNALS

CROSS-REFERENCE TO RELATED APPLICATION

This application discloses subject matter disclosed and claimed in co-owned, co-pending application U.S. Ser. No. 07/905,724, filed on the same day as this application, which is hereby incorporated by reference.

TECHNICAL FIELD

The invention concerns a circuit device for equalizing nonlinear distorted signals transmitted through optical communication systems.

BACKGROUND OF THE INVENTION

Such a circuit is known from Electronics Letters of Feb. 28, 1991, Vol. 27, No. 5, pages 421 to 423. It is an LC component, whose capacitance is formed by coupling a capacitor in parallel with the capacitance of a variable capacitance diode (called "varactor"). Its capacitance depends on the blocking voltage existing therein, which is composed of a suitable bias voltage, and the signal voltage at the inlet to the circuit. Due to the dependence of the capacitance on the signal voltage, the signals have a voltage-dependent delay.

Tests have shown that sufficient equalization, which does not attenuate the signals too much, is only possible with the known LC component if the signals to be equalized are not too large, on the one hand, and the bandwidth of the signals to be transmitted is not too large, on the other. The nonlinear distortions being experienced by a signal that is optically transmitted over an optical fiber path, and which are to be equalized by the named circuit device, are caused to a large extent by the so-called "laser chirp", i.e. a spurious wave length fluctuation of the optical signal, which is a function of the amplitude of the electrical signal to be optically transmitted, and the waveguide dispersion of the optical fiber being used, and its length. The greater this effect, the larger the nonlinear distortions experienced by the signal.

It was shown that a satisfactory signal transmission is possible with a laser emitting at a wavelength of 1550 nm, which has a relatively small "laser chirp", with a standard single-mode optical fiber and an equalizer of the above named type, if the length of the optical fiber is not longer than 12 km and the bandwidth of the signals to be transmitted is not larger than 450 MHz. If signals are to be equalized, which have traversed a longer than 12 km optical fiber length, the known equalizer only offers the possibility of adjusting the bias of the capacitance diode correspondingly low, which, however, lowers the limit frequency of the equalizer, i.e. the maximum frequency of the signals transmitted without any attenuation. In other words: if the known equalizer is able to equalize considerable signal distortions, its limit frequency is so low, that it is too small to transmit broadband signals, such as e.g. the signals of the cable TV frequency band, which extend to 450 MHz.

DISCLOSURE OF INVENTION

It is therefore the invention's task to indicate an equalizer which, on the one hand, is suitable for heavy distortions, and on the other, has a limit frequency that is high enough for broadband signal transmission, e.g. a frequency band that extends up to 600 MHz.

According to the present invention, an equalizer for compensating non-linear distortions in signals transmitted through optical communication systems uses an LC chain circuit, with LC components.

In further accord with the present invention, varactor diodes are connected to a single DC voltage source for determining their bias. On the other hand, the varactor diodes may be connected to different DC voltage sources for determining their bias.

In still further accord with the present invention, a circuit designed to compensate for non-linear distortions in signals transmitted through optical communication systems comprises an LC ladder network having a plurality of varactor diodes, wherein an additional reverse-biased varactor diode is connected in inverse parallel with the varactor diodes of each section of the LC ladder network and that two bias voltages are adjustable so that either essentially only one of the varactor diodes or essentially only another of the varactor diodes has a capacitance for varying with the applied signal voltage.

Still further in accordance with the present invention, a plurality of varactor diodes are used as capacitive elements in an LC ladder network for compensating for non-linear distortions in signals transmitted through optical communication systems, wherein two varactor diodes in series opposition have a total capacitance determined by an adjustable bias and are connected in parallel with the capacitive element of each LC section of the LC ladder network.

In further accordance with the present invention, a control circuit for an LC ladder network for compensating for non-linear distortions in signals transmitted through optical communication systems comprises a device which measures at the output of the LC ladder network second order distortion products of one or more pilot signals as a measure of non-linear distortions in transmitted signals, and a controller which adjusts the bias of a varactor diode having a capacitance which varies with the applied signal voltage, wherein the adjustment obtains a maximum reduction of the measured distortion products and maintains the bias of another varactor diode at a constant maximum value.

In still further accord with the present invention, a control circuit may comprise a device which measures at the output of an LC ladder network having capacitive elements which are reverse-biased varactor diodes, the second order distortion products of one or more pilot signals as a measure of the non-linear distortions in the transmitted signals, a frequency response measuring device which measures at the output of the LC ladder network the level difference of two pilot signals as a measure of the frequency dependence of the attenuation of the LC ladder network, and a controller which adjusts the bias of one of two additional reverse-biased varactor diodes connected in inverse parallel with the varactor diode of each section of the LC ladder network, wherein the adjustment obtains a maximum reduction of the measured distortion products and, if necessary, maintains the measured level difference of the two pilot signals constant during said adjustment by varying the bias of the other varactor diode of the pair. The control circuit may instead have a controller which adjusts the bias of one of the pair of varactor diodes in series opposition to obtain a maximum reduction of the measured distortion products, maintains the bias of the other varactor diode in the pair at a constant maximum value and adjusts the bias determining the total capacitance of the two varactor diodes in series opposition such that the level difference of the two pilot signals remains substantially independent of the adjustment of the bias of the one varactor diode.

Similarly, that sort of control circuit may contain instead a controller which adjusts the bias of the varactor diode to obtain a maximum reduction of the measured distortion products and adjusts the bias determining the total capacitance of the two varactor diodes in series opposition, such that the level difference of the two pilot signals remains substantially independent of the adjustment of the bias of the varactor diode.

These and other objects, features and advantages of the present invention will become more apparent in light of the following detailed description of a best mode embodiment thereof, as illustrated in the accompanying drawings.

BEST MODE FOR CARRYING OUT THE INVENTION

Figure 1:
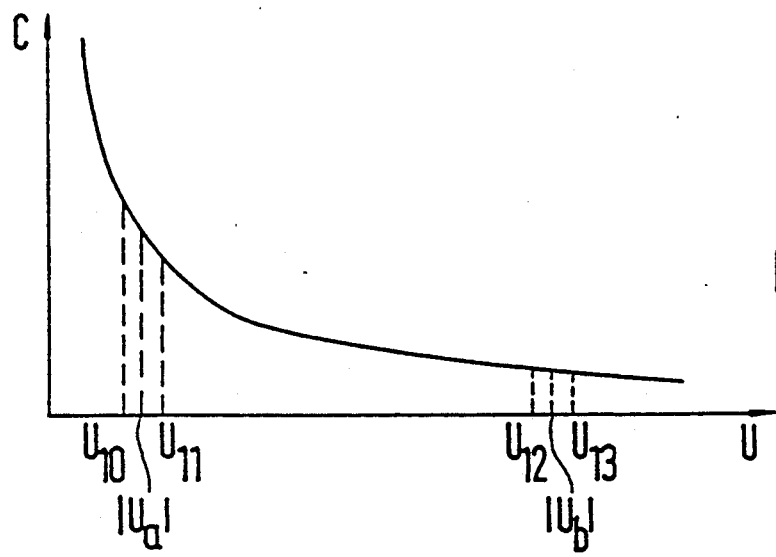
FIG. 1 shows the connection between the capacitance of a variable capacitance diode and its voltage, to explain the demands made on the equalizer, according to an insight of the present invention.

FIG. 1 shows the voltage dependency of the capacitance of a variable capacitance diode, and thereby the problem solved by the invention. The curve in FIG. 1 shows qualitatively, how the capacitance of the variable capacitance diode is a function of its voltage U, which is polarized in the high-resistance direction. As qualitatively indicated by the curve, the capacitance drops as the blocking voltage U increases. It can be seen that C changes sharply with U; the larger C is, the smaller U becomes. C varies sharply if the diode is so biased, that its voltage varies for example between $U_{10}$ and $U_{11}$ due to the signal voltage. If the diode is so biased, that its voltage varies for example between $U_{12}$ and $U_{13}$, its capacitance varies considerably less.

If it is necessary to operate the diode in the steep range of the capacitance-voltage curve, because of the existing distortions, it unavoidably operates with large capacitance, which lowers the limit frequency of the known equalizer, as mentioned earlier.

Figure 2:
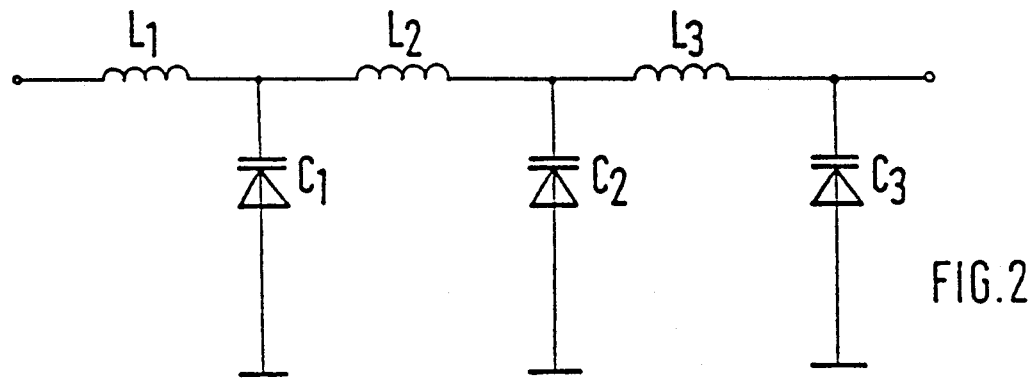
FIG. 2 shows the principle of an equalizer according to the invention, in the form of an LC chain circuit.

The circuit according to the invention, shown in principle in FIG. 2, has the ability to fulfill both the requirement of a high limit frequency, as well as the requirement of equalizing strong nonlinear distortions, such as appear in long optical fiber paths, for example.

The solution is an LC chain circuit, wherein at least part of the capacitive elements are variable capacitance diodes, which operate in the high-resistance direction. FIG. 2 shows an example of a three-link chain with inductances $L_1$, $L_2$ and $L_3$, and variable capacitance diodes $C_1$, $C_2$ and $C_3$. Of course, chain circuits with any desired number of LC components of the indicated type are suitable in principle, as well as LC chain circuits whose capacitive elements consist not only of variable capacitance diodes. For example, the chain circuit may contain one or more LC components, which, like the known equalizer, contain additional or only one normal capacitor.

The variable capacitance diodes may be polarized as shown in FIG. 2, or in the opposite way. Which polarity is the right one depends on the existing signal distortion, as will be explained later.

In principle, with the chain circuit shown in FIG. 2, the inductances and capacitances can be chosen as required by the surge impedance of the line into which the circuit is to be inserted, and the bandwidth of the signals to be transmitted through the line. It is particularly possible to select the capacitances in such a way, and/or operate them with suitable bias voltages, so that they have a low capacitance. The circuit parts needed to bias the variable capacitance diodes have been omitted in FIG. 2, for simplification.

However, when selected this way, the equalization performed by each individual LC component is then relatively small. For example, it is the type of equalization that results when the capacitance is determined by voltages between $U_{12}$ and $U_{13}$, according to the curve in FIG. 1. Still, the full LC chain circuit has considerable equalizing capability, because the distortions affected by the individual components add up, therefore the total of all LC components produces a sufficient voltage-dependent delay of the input signals, thus sufficient equalization of the nonlinear distorted signals.

Since the total distortion of the LC chain circuit in the invention is composed of the sum of contributions of the individual LC components, the individual LC components may be operated so that their capacitance is relatively small and produces only small changes in the other circuit parameters, even when the distortion stops. This causes their effect on the frequency dependence of the attenuation, the so-called frequency response of the entire LC chain, to remain relatively small.

Another advantage of the LC chain circuit, according to the invention, lies in the fact that the bias voltages of the individual variable capacitance diodes may be different and varied, independently of each other. This provides as many degrees of freedom to adjust the equalizer for any existing distortion, as there are variable capacitance diodes. It is possible, for example, to operate one or more of the LC components at such a high blocking voltage, that it practically contributes nothing to the equalization, and is only permitted to contribute to the equalization when its blocking voltage is reduced as needed.

Figure 3:
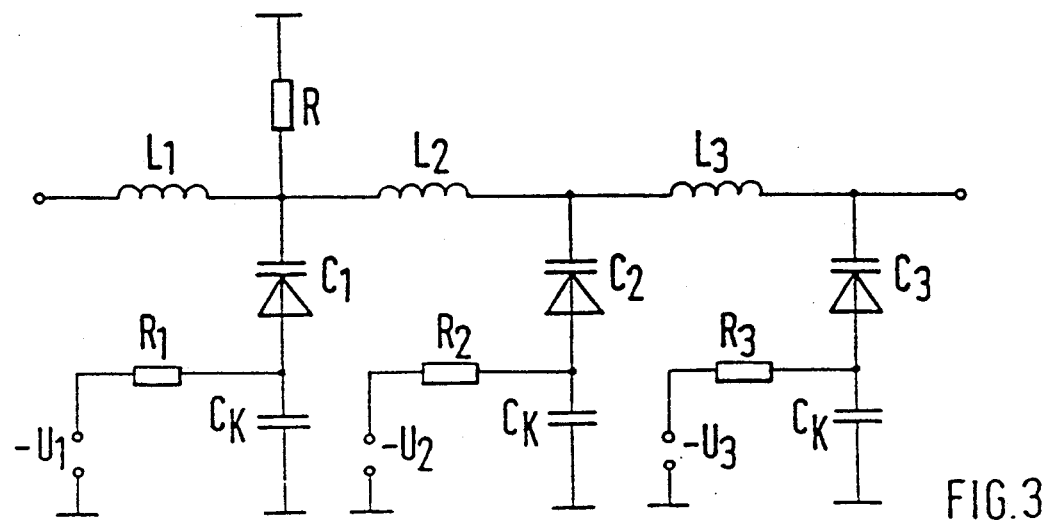
FIG. 3 shows a configuration of the invention, with the bias voltages applied to the variable capacitance diodes.

FIG. 3 represents the same LC chain circuit as FIG. 2, but together with circuit components used to bias the variable capacitance diodes. A DC circuit, leading from ground through a resistor R, the variable capacitance diode $C_1$, a resistor $R_1$ and a DC voltage source $U_1$, one pole of which is grounded, is used to bias the variable capacitance diode $C_1$. The voltage existing at the capacitance diode $C_1$ when the input voltage of the inductance $L_1$ is absent, and hence the bias voltage or the operating point of the capacitance diode, can be specified by suitably controlling the voltage of voltage source $U_1$. The designation $-U_1$ of one pole of voltage source $U_1$ indicates that the anode of the variable capacitance diode $C_1$ connected to this pole must have a lower potential than the cathode connected to ground through resistor R. The corresponding DC circuits used to bias the variable capacitance diodes $C_2$ and $C_3$ are represented by a resistor $R_2$ and a voltage source $U_2$, or by a resistor $R_3$ and a voltage source $U_3$. Capacitors $C_k$ are connected between the anodes of the variable capacitance diodes $C_1$ to $C_3$ and ground, in order to ground the anodes in an alternating voltage fashion.

Of course, it is also possible to connect the cathodes to a single voltage source, either through different resistors $R_1$ to $R_3$, or through a single resistor, in this instance e.g. resistor $R_1$, to the common voltage source $U_1$.

The following considers a problem and its solution according to the invention, which applies equally to the known LC component, and to each of the LC components of the above described LC chain circuit. Only one LC component is therefore being considered.

It was shown for the known LC component, and thereby also for the above described LC chain circuit, that the ability of the LC component to equalize signals is only available in one of the two possible polarities of the variable capacitance diode. Whether or not the desired equalization takes place depends therefore on whether the variable capacitance diode is connected to the input line through its cathode or through its anode.

Which polarity is the right one cannot be predicted, since in practical communication transmission systems it is possible for the polarity to be reversed in the transmission path between the sending laser and the equalizer place, e.g. by inverting amplifiers, which are unknown to the operator and the installer of the communication transmission systems, because they play no role, except for the nonlinear signal distortion being considered here. When installing such an equalizer in a transmission path, it is not desirable, for practical reasons, to have to detect the appropriate polarity of the variable capacitance diode by a test. It would be more desirable to have an equalizing circuit that functions in all instances.

Figure 4:
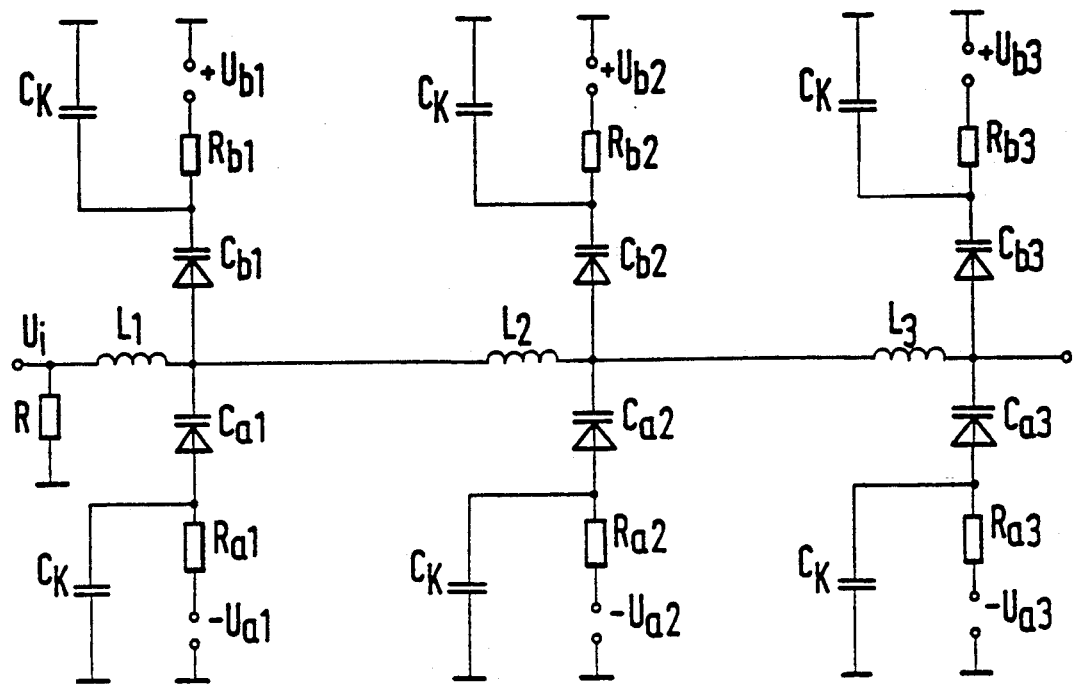
FIG. 4 shows a circuit according to FIG. 3, in which each variable capacitance diode has a second one coupled antiparallel.

As shown in FIG. 4, according to the present invention, the solution consists in coupling another variable capacitance diode, which is also biased in the high-resistance direction, in parallel with the opposite pole of each variable capacitance diode of an LC component (FIG. 3). Each of the equalizer's LC components in FIG. 4 has an inductance L and a first variable capacitance diode $C_a$, connected to inductance L by its cathode, and which is biased to the pole in the high-resistance direction In this way it corresponds to the equalizer (FIG. 4b) of the publication named in the beginning. A DC circuit is used to bias the variable capacitance diode, leading from ground through a resistor R, the inductance L, the cathode of variable capacitance diode $C_a$, its anode and a resistor $R_a$, to the negative pole of a DC voltage source $U_a$, whose other pole is connected to ground. (The indexes, which show whether an element belongs to the 1st., 2nd. or 3rd. LC component, have been omitted, since only one LC component is being considered.)

With this polarity of the variable capacitance diode, the existing blocking voltage increases with positive inlet voltages $U_i$, thereby reducing its capacitance, so that more positive voltages pass faster through the equalizer than less positive ones. The variable capacitance diode $C_a$ only performs an equalization, when its existing transmission path has the ability to delay more positive voltages longer than less positive voltages. Whether this is the case depends on the number of inverting amplifiers built into the path, and can never be predicted with certainty. If this premise was incorrect, the equalizer would amplify the existing distortion, instead of counteracting it.

To solve the described problem, a second variable capacitance diode $C_b$ is supplied as shown in FIG. 4, and is coupled antiparallel to the first variable capacitance diode $C_a$. While $C_a$ is connected to inductance L by its cathode, $C_b$ is connected to L by its anode. To bias it also in the high-resistance direction, a voltage source $U_b$ is provided, which, together with resistor R and a resistor $R_b$, forms a DC circuit for the variable capacitance diode $C_b$. The positive pole of voltage source $U_b$ is connected to the cathode of variable capacitance diode $C_b$, so that it is biased in the high-resistance direction. Through capacitors $C_k$, both variable capacitance diodes are connected in alternating voltage fashion to ground, by their connectors facing away from inductance L.

As with the known equalizer, in addition to the capacitance of the variable capacitance diodes, the capacitance of a normal capacitor may also be present.

The new equalizer according to FIG. 4 has the ability that, regardless of which polarity distorts the input signal, one of the two variable capacitance diodes counteracts each LC component of the distortion, and the other amplifies the distortion. To what degree this takes place depends on the amount of the bias voltage polarized in the high-resistance direction.

It will now be explained by means of FIG. 1, that adjusting both bias voltage rates can achieve the result that one of the two variable capacitance diode performs the desired equalization function, and the other is nearly inactive with respect to distortion or equalization. The curve in FIG. 1 shows schematically and only qualitatively, how the capacitance of a variable capacitance diode depends on its voltage in the high-resistance direction. It can be seen that the capacitance decreases with increasing blocking voltage, and that the steepness, at which the capacitance decreases, also decreases with increasing blocking voltage. Consequently, lower blocking voltage must be used to operate a diode, if it is desired to markedly change its capacitance with the existing voltage, and higher blocking voltage must be used, if it is desired to change its capacitance very little with the existing voltage. For example, if the bias voltage $-U_a$ of the FIG. 4 circuit is chosen so that the rate of the variable capacitance diode $C_a$ is small, an operating point is thereby selected for this variable capacitance diode, at which the capacitance is highly voltage-dependent as shown in FIG. 1. If bias voltage $+U_b$ is chosen at the same time so that the rate of variable capacitance diode $C_b$ is high, an operating point is thereby selected, at which the capacitance depends only slightly on the voltage, as shown in FIG. 1. In that event, $C_a$ has a strong equalizing or strong distorting effect, depending on how the distortion of the input signals is a function of their polarity, and $C_b$ has a weak equalizing or a weak distorting effect. Inversely, a high bias voltage rate in $C_a$ and a low bias voltage rate in $C_b$ produce a weak voltage-dependence condition in the former and a strong voltage-dependence condition in the latter.

With the new equalizer in practical use, the following can be used to detect whether a high bias voltage rate in $C_a$, and a low bias voltage rate in $C_b$, or inversely, will have the desired equalizing function effect.

The criterion for calibrating the equalization by adjusting the bias voltages $U_a$ and $U_b$ is the nonlinear signal distortion, which takes place in the signal to be transmitted, caused by the laser chirp and the chromatic dispersion of the optical fiber, which forms the transmission path to the optical receiver. This non-linear distortion manifests itself as a contribution to undesired signal parts in the output signal of the optical receiver, and in a possible electrical amplifier connected downstream. Of the undesirable signal parts, the composite second, order distortions are particularly disruptive. These are oscillations at frequencies that do not occur in the transmitted signal, namely oscillations at frequencies, which are the sum and difference frequencies of the oscillations that constitute the input signal to the laser in the transmission path.

To establish the magnitude of the occurring distortion products, a so-called pilot signal of a determined frequency, i.e. an unmodulated oscillation, can be added to the laser input signal and the resulting composite second order distortions, namely oscillations with double their level of frequencies, can be measured on the receiving side. However, two such pilot signals may also be added and the resulting oscillation with the sum of their level of frequencies can be measured on the receiving side. Composite second order distortions indicate in each instance the magnitude of the nonlinear distortions of the transmitted signals.

The objective of the equalization is to suppress as much as possible the composite second order distortions. The relative measure of the suppression of the composite second order distortions is therefore a measure of the effectiveness of the equalization.

The bias voltages of both variable capacitance diodes $C_a$ and $C_b$ are now calibrated as a function of the second order nonlinear distortion factor of the pilot signal, measured at the equalizer output. First, both bias voltages are adjusted to their maximum values. According to FIG. 1, at maximum bias voltage, they have no significant effect on the distortion of the signal. Then one of the two bias voltages is reduced and the change in the measured nonlinear distortion factor is noted. For example, if $U_a$ is reduced and the distortion factor increases, it is clear that $C_a$ is not the variable capacitance diode that can produce the desired equalization at low blocking voltage. $U_a$ is then returned to its maximum value, e.g. 30 V. Optimum equalization can now be calibrated by means of the $U_b$ bias voltage, by reducing $U_b$, which also reduces the measured nonlinear distortion factor, until this factor begins to increase, i.e. after it has reached its minimum.

The described calibration of the bias voltages of both variable capacitance diodes may either be performed manually, as a function of the indication of an instrument measuring the nonlinear distortion factor, or the voltages may be regulated by an automatic circuit, consisting of such a measuring instrument and a control, which regulates the bias voltages as a function of the measured value. An automatic control is preferable, since the equalizer of the invention is then automatically corrected for any optical transmission path, and can also be adjusted for any changes that may take place in a transmission path due to maintenance, repair or any other change in the transmission network, which inverts the polarity of the receiving signals at the end of a transmission path. The need for an adjustment may occur, even after optimization, for example due to temperature fluctuations or the aging of components, or other changes.

The above description shows that, depending on the bias voltages of diodes $C_a$ and diodes $C_b$, the LC chain circuit functions as an equalizer either with the capacitances of diodes $C_a$ (lower portion) or with the capacitances of diodes $C_b$ (upper portion).

Regardless of whether an LC component contains only one variable capacitance diode (as in FIG. 2), or two variable capacitance diodes (as in FIG. 4), the preceding example considered the instance wherein the equalizing variable capacitance diode is biased so as to perform the required equalization, i.e. it functions at a working point at which its C-U curve (FIG. 1) has the required steepness. During the operation of such an equalizer, it may occur that the required equalization has been reduced, either because the transmission path laser primarily responsible for the distortion has been replaced by a better one, or because the equalizer has been connected to a low dispersion optical fiber path, or to a optical fiber path of short length.

The blocking voltage must then be increased accordingly, so that the equalizer functions at a low steepness working point in the C-U curve, thereby adapting the equalization to the changed conditions. As shown in FIG. 1, such adaptation unavoidably reduces the capacitance of the variable capacitance diode that produces the equalization, which in turn can change the wave impedance of the line, and thereby the attenuation of the signals to be transmitted, with respect to their frequency dependence. It may therefore occur that the equalization is optimized by the cited adaptation, but the frequency dependence of the equalizer attenuation, the so-called frequency response, is simultaneously degraded.

It would therefore be desirable to be able to balance the capacitance reduction of an LC component made for equalization purposes.

Figure 5:
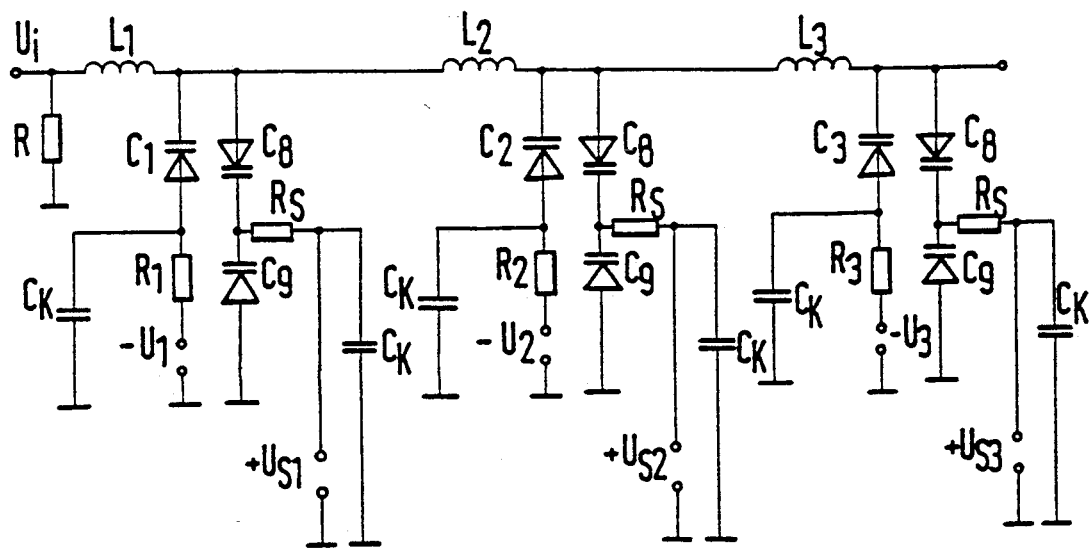
FIG. 5 shows a circuit according to FIG. 3, in which each variable capacitance diode has an antiseries circuit of a controllable capacitance coupled in parallel.

FIG. 5 illustrates a further development of the described invention, which provides the possibility of balancing the cited capacitance reduction. The left portion of each LC component is identical to each of the LC equalizer components in FIG. 3, therefore they require no further explanation. The right portion shows an antiseries circuit of two variable capacitance diodes $C_8$ and $C_9$, connected in parallel to the capacitance of the LC component described earlier. A controllable voltage source $U_S$, whose one pole is connected to ground and the other pole, positive with respect to ground, is connected through a resistor $R_S$ with the connection point of the anodes of both variable capacitance diodes, serves to bias both variable capacitance diodes $C_8$ and $C_9$ in the high-resistance direction. A capacitor $C_K$ is connected in parallel to voltage source $U_s$ and to ground, to block any high frequency oscillations from the voltage source.

Figure 6:
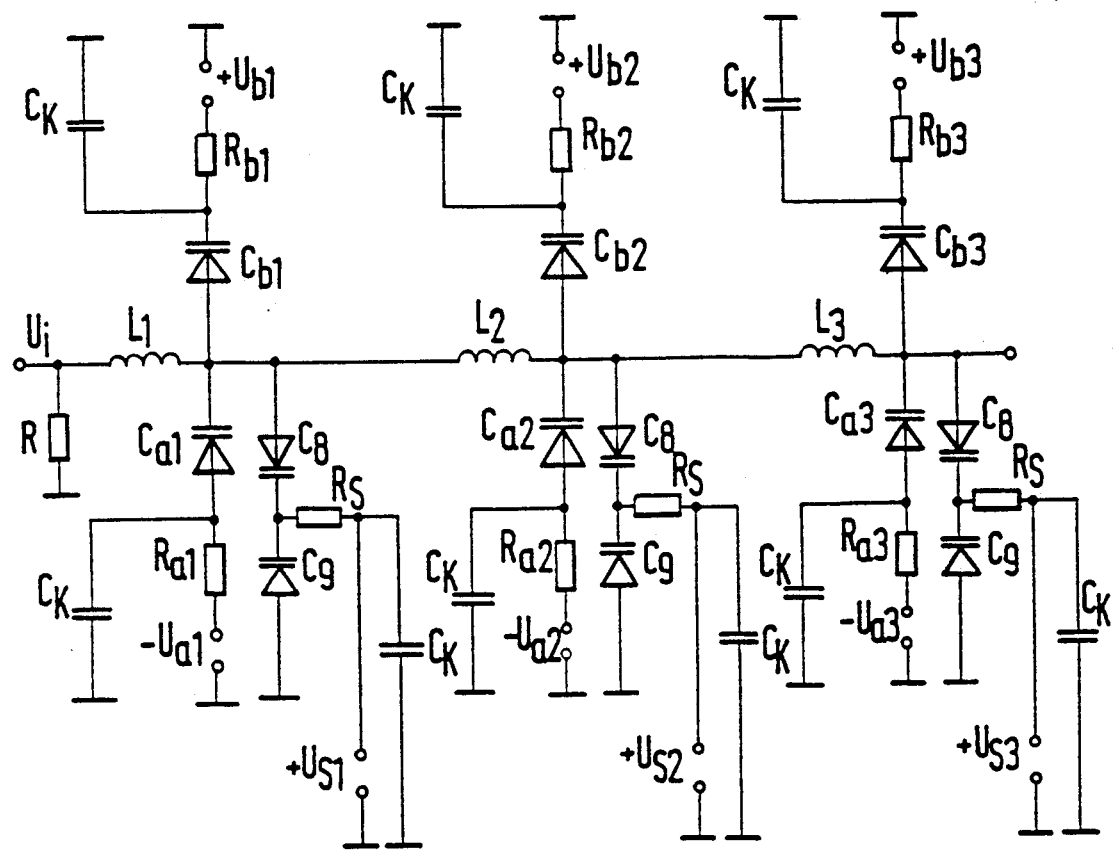
FIG. 6 shows a circuit according to FIG. 3, with the two developments described in FIGS. 4 and 5.

In FIG. 6, the same antiseries circuit is added to each LC component shown in FIG. 4. There, it is connected in parallel to each of the two variable capacitance diodes $C_a$ and $C_b$ of an LC component.

As will be explained later, the equalizer according to FIG. 5 or 6 has the advantage that the total capacitance $C_8$ of the antiseries circuit of both variable capacitance diodes $C_8$ and $C_9$ depends on the bias voltage $U_s$, and can therefore be controlled by it, but on the other hand, it does not depend in the first instance on the signal voltage $U_i$; thus it exerts no influence on the distortion or equalization of the signal. In this way, a controllable capacitance is connected in parallel to the capacitance $C_i$ (i=1, 2, or 3) in FIG. 5, or to the parallel circuit of capacitances $C_a$ and $C_b$ in FIG. 6, to compensate for an unavoidable change in the capacitance of $C_i$ or $C_a$ or $C_b$, occurring in conjunction with the required signal equalization.

Since the controllable capacitance of the antiseries circuit of $C_8$ and $C_9$ has the possibility of completing the optimum capacitance of variable capacitance diode $C_i$ or $C_a$ or $C_b$ for the total capacitance of the LC component, which guarantees the desired frequency response of the LC component, it is also possible to first adjust $C_i$ or $C_a$ or $C_b$ to an average equalization as the starting point, and to adjust the total capacitance of the LC component by selecting the appropriate control voltage $U_S$ for optimum frequency response. If it is necessary to increase the equalization, in other words the capacitance of $C_i$ or $C_a$ or $C_b$, in order to start from such a working point, this can be balanced by the corresponding reduction of the capacitance of the antiseries circuit of $C_8$ and $C_9$, by changing the control voltage $U_S$.

Therefore, generally speaking, the series circuit of $C_8$ and $C_9$ is a controllable capacitance, which serves to balance any changes of the LC component's total capacitance, required to optimize the equalization, so that the frequency response of the LC component can be kept constant, in spite of the changes in C or $C_a$ or $C_b$.

The following explains why the total capacitance of the series circuit depends essentially only on the control voltage $U_S$, and not on signal voltage $U_i$. As long as the signal voltage $U_i$ is zero, the control voltage $U_S$ is between the cathode and anode of $C_8$, and also between the cathode and anode of $C_9$ (no DC current flows through $R_s$). The variable capacitance diodes $C_8$ and $C_9$ are equal, and their capacitance, which is regulated by control voltage $U_S$, is described as $C_0$. A signal voltage $U_i$ produces a voltage $U_{C8} = U_S - \frac{1}{2} U_i$ between the anode and the cathode of $C_8$, and a voltage $U_{C9} = U_S + \frac{1}{2} U_i$ between the anode and the cathode of $C_9$, since half of the voltage $U_i$ drops off in $C_8$ and half in $C_9$. In other words, a change in the signal voltage from 0 to $U_i$ lowers the $U_s$ blocking voltage existing in $C_8$ by $\frac{1}{2} U_i$ and raises the $U_s$ blocking voltage existing in $C_9$ by $\frac{1}{2} U_i$. This increases the capacitance of $C_8$ to $C_8 = C_0 + \Delta C$ and reduces the capacitance of $C_9$ to $C_9 = C_0 - \Delta C$, where $\Delta C$ represents a low value. The total capacitance of the series circuit is therefore:

$$C_g = \frac{C_8 \cdot C_9}{C_8 + C_9} = \frac{C_0^2 - \Delta C^2}{2C_0} \approx \frac{C_0}{2}$$

because $\Delta C^2$ can be neglected due to the small value of $\Delta C$. As mentioned above, since $C_0$ is only determined by $U_S$, the total capacitance only depends on $U_S$ and not on signal voltage $U_i$, at least in the first approximation.

As an alternative to the circuit in FIG. 6, it seems possible to omit the antiseries circuit of $C_8$ and $C_9$, i.e. to use an equalizer according to FIG. 4, and to balance the change in capacitance of the one variable capacitance diode $C_a$ by changing the capacitance of $C_b$, i.e. not leaving $U_b$ at its maximum value, but readjusting it so that, when changing the bias voltage $U_a$ to optimize the equalization change caused by $C_a$, the wave impedance of the LC component, and thereby its frequency response, remain unaffected.

As can be seen from the preceding, the circuit according to the invention offers different possibilities for controlling the bias voltages $U_a$ and $U_b$, and possibly the control voltage $U_S$.

The criterion for controlling the frequency response of the equalizer is the difference in attenuation, which can be measured at the equalizer outlet when different frequencies are transmitted over the entire transmission path. It is preferably measured by adding, on the sending side, two pilot signals of different frequencies at constant levels, to the electrical signal mixture to be transmitted, and measuring the difference in the levels of both pilot signals at the outlet of the equalizer on the receiving side, which should be a specified value in the ideal case.

The criterion for adjusting the equalization of the equalizer is the above explained composite second order distortion factor. If this distortion factor is measured with a nonlinear distortion detector, and the difference in the levels of two pilot signals of different frequencies is measured with a so-called frequency response measuring instrument, the equalization, and possibly the equalizer's frequency response, can be controlled manually, as explained earlier.

On the other hand, the equalizer can be expanded to an automatic equalization circuit, by the addition of a control circuit.

Figure 7:
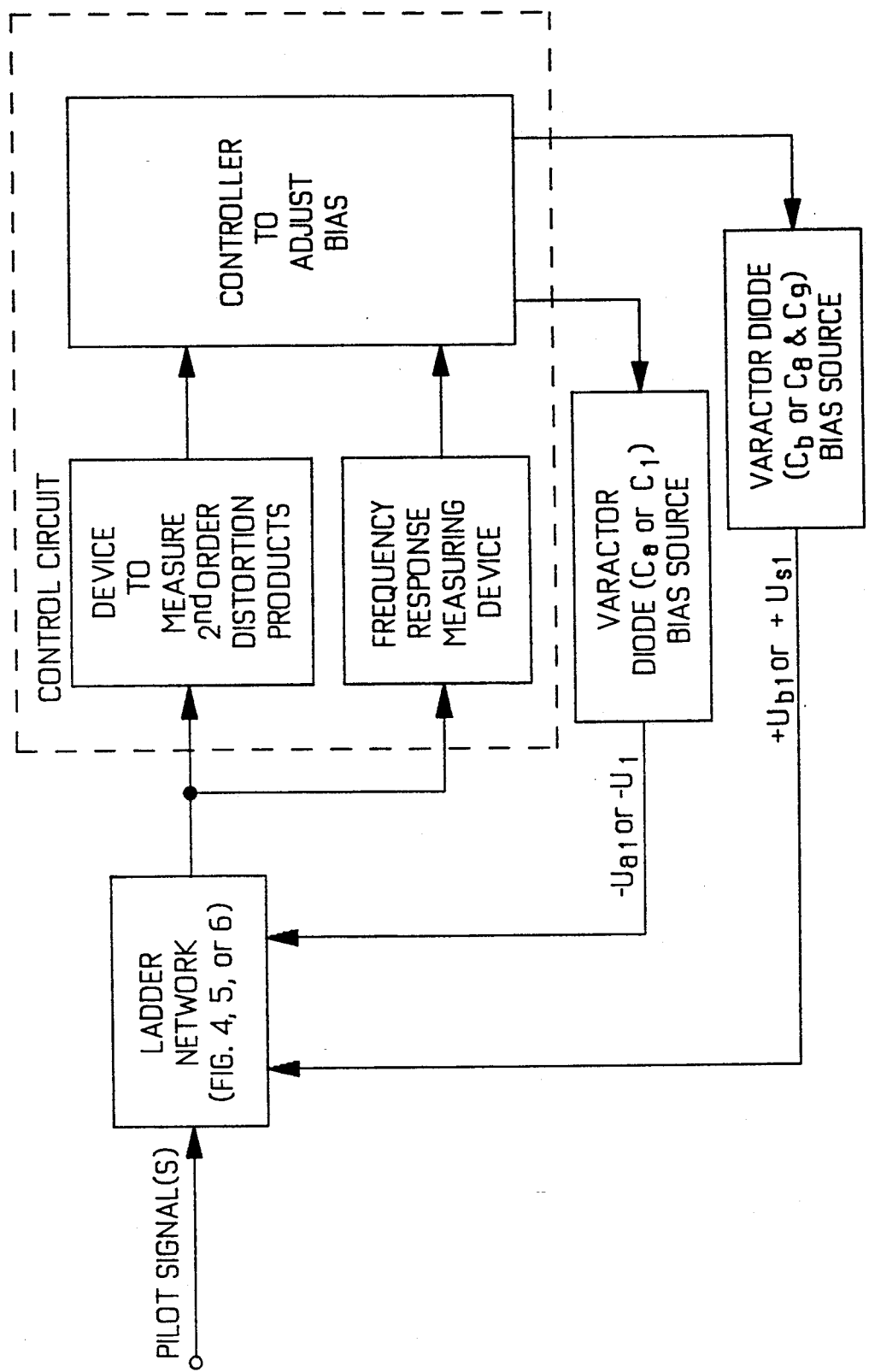
FIG. 7 shows a control circuit, according to the present invention, for adjusting the bias of a varactor diode.

As shown in FIG. 7, the following prospects arise, based on the above explained control possibilities and measurable adjustment criteria:

a) The circuit contains an equalizer according to FIG. 4. A nonlinear distortion detector is attached to its outlet, and measures composite second order distortion products created by one or more pilot signals. The detector's output signal is supplied to a control, which adjusts the bias voltages $U_a$ and $U_b$ in accordance with the measured nonlinear distortion products, in such a way, that one of the two diodes performs the practical equalization, while the other operates at maximum bias voltage and does not contribute to the distortion or equalization.

b) The equalizer is also one in accordance with FIG. 4. A nonlinear distortion detector and an instrument for measuring frequency response are attached to its outlet, and measure the composite second order distortion products created by one or more pilot signals. Both output signals are supplied to a control, which, as described above, essentially adjusts the required equalization through one of the two diodes, and also maintains the equalizer's frequency response constant, by means of the other diode.

c) The circuit contains an equalizer according to FIG. 6, and the control circuit consists of a nonlinear distortion detector attached to the equalizer's outlet, for measuring second order distortion products created by one or more pilot signals, and an instrument that measures frequency response, as described earlier. Both output signals are supplied to a control, which establishes the magnitude of the adjustment of bias voltages $U_a$, $U_b$ and $U_S$, thus controlling the equalization as well as keeping the frequency response constant.

d) The circuit contains an equalizer according to FIG. 5. A nonlinear distortion detector that measures second order distortion products created by one or more pilot signals, as well as an instrument measuring frequency response, are attached to the equalizer's outlet. The output signals are supplied to a control, which forms the variables for adjusting the bias voltage of the variable capacitance diode serving as equalizer, and to keep the equalization's frequency response constant.

Since not only the laser chirp, in conjunction with the chromatic dispersion of the optical fiber, causes composite second order distortions, but also the nonlinearity taking place in the laser due to intensity modulations, it appears useful for the above described equalization on the receiving side, to use a preequalizer for the laser, to compensate for the laser's nonlinearity, preferably a controlled preequalizer, e.g. of the type known from German Patent application DE-A1 33 07 309.

We claim:

1. Circuit designed to compensate for nonlinear distortions in signals transmitted through an optical communication system, characterized in that the signals are analog signals, the circuit receives the signals from the communication system and the circuit comprises an LC ladder network ($L_1$, $C_1$, $L_2$, $C_2$, $L_3$, $C_3$) having capacitive elements which are reverse-biased varactor diodes ($C_1$, $C_2$, $C_3$), the total of all LC components producing a sufficient voltage-dependent delay of the analog signals transmitted through the optical communication system so as to result in sufficient equalization of the received signals having nonlinear distortions.

2. A circuit as claimed in claim 1, characterized in that two additional varactor diodes in series opposition ($C_8$, $C_9$) whose total capacitance is determined by an adjustable bias ($U_s$) are connected in parallel with the capacitive element of each LC section of the LC ladder network.

3. A circuit as claimed in claim 1, characterized in that the varactor diodes ($C_1$ to $C_3$) are connected to different DC voltage sources ($U_1$, $U_2$, $U_3$) determining their bias.

4. A circuit arrangement as claimed in claim 1, characterized in that an additional reverse-biased varactor diode ($C_b$) is connected in inverse parallel with the varactor diode ($C_a$) of each section of the LC ladder network, and that two bias voltages ($U_a$, $U_b$) are connected to each section which are adjustable so that either essentially only one ($C_a$) of the varactor diodes or essentially only the other ($C_b$) has a capacitance varying with the applied signal voltage ($U_i$).

5. A circuit as claimed in claim 4, characterized in that two additional varactor diodes in series opposition ($C_8$, $C_9$) whose total capacitance is determined by an adjustable bias ($U_s$) are connected in parallel with the capacitive element of each LC section of the LC ladder network.

6. A circuit as claimed in claim 4, characterized in that it has a control circuit which contains:
   a device which measures at the output of the LC ladder network the second-order distortion products of one or more pilot signals as a measure of the nonlinear distortions in the transmitted signals, and
   a controller which adjusts the bias ($U_a$) of said one varactor diode ($C_a$) to obtain a maximum reduction of the measured distortion products and maintains the bias ($U_b$) of said other varactor diode ($C_b$) at a constant maximum value.

7. A circuit as claimed in claim 4, characterized in that it has a control circuit which contains:
   a device which measures at the output of the LC ladder network the second-order distortion products of one or more pilot signals as a measure of the nonlinear distortions in the transmitted signals,
   a frequency-response-measuring device which measures at the output of the LC ladder network the level difference of two pilot signals as a measure of the frequency dependence of the attenuation of the LC ladder network, and
   a controller which adjusts the bias ($U_a$) of said one varactor diode ($C_a$) to obtain a maximum reduction of the measured distortion products and, if necessary, maintains the measured level difference of the two pilot signals constant during said adjustment by varying the bias ($U_b$) of said other varactor diode ($C_b$).

8. A circuit as claimed in claim 5, characterized in that it has a control circuit which contains:
   a device which measures at the output of the LC ladder network the second-order distortion products of one or more pilot signals as a measure of the nonlinear distortions in the transmitted signals,
   a frequency-response-measuring device which measures at the output of the LC ladder network the level difference of two pilot signals as a measure of the frequency dependence of the attenuation of the transmitted signals, and
   a controller which adjusts the bias ($U_a$) of said one varactor diode ($C_a$) to obtain a maximum reduction of the measured distortion products, maintains the bias ($U_b$) of said other varactor diode ($C_b$) at a constant maximum value, and adjusts the bias ($U_S$) determining the total capacitance of the two varactor diodes ($C_8$, $C_9$) in series opposition such that the level difference of the two pilot signals remains substantially independent of said adjustment of the bias ($U_a$) of said one varactor diode ($C_a$).

9. A circuit as claimed in claim 5, characterized in that it has a control circuit which contains:
   a device which measures at the output of the LC ladder network the second-order distortion products of one or more pilot signals as a measure of the nonlinear distortions in the transmitted signals,
   a frequency-response-measuring device which measures at the output of the LC ladder network the level difference of two pilot signals as a measure of the frequency dependence of the attenuation of the transmitted signals, and
   a controller which adjusts the bias of the varactor diode to obtain a maximum reduction of the measured distortion products and adjusts the bias determining the total capacitance of the two varactor diodes in series opposition such that the level difference of the two pilot signals remains substantially independent of said adjustment of the bias of the varactor diode.

10. A circuit as claimed in claim 5, characterized in that it has a control circuit which contains:
   a device which measures at the output of the LC ladder network the second-order distortion products of one or more pilot signals as a measure of the nonlinear distortions in the transmitted signals, and
   a controller which adjusts the bias ($U_a$) of said one varactor diode ($C_a$) to obtain a maximum reduction of the measured distortion products and maintains the bias ($U_b$) of said other varactor diode ($C_b$) at a constant maximum value.

* * * * *